United States Patent
Tsuboi et al.

(10) Patent No.: US 8,059,504 B2
(45) Date of Patent: Nov. 15, 2011

(54) OPTICAL PICKUP APPARATUS, OPTICAL RECORDING MEDIUM DRIVING APPARATUS, AND SIGNAL RECORDING/REPRODUCING METHOD

(75) Inventors: Taku Tsuboi, Kanagawa (JP); Eiichi Ueda, Tokyo (JP)

(73) Assignee: Sony NEC Optiarc Inc., Tokyo (JP)

( * ) Notice: Subject to any disclaimer, the term of this patent is extended or adjusted under 35 U.S.C. 154(b) by 362 days.

(21) Appl. No.: 12/192,605

(22) Filed: Aug. 15, 2008

(65) Prior Publication Data

US 2009/0086610 A1 Apr. 2, 2009

(30) Foreign Application Priority Data

Sep. 28, 2007 (JP) ................................. 2007-253423

(51) Int. Cl.
*G11B 5/09* (2006.01)
(52) U.S. Cl. ................ 369/47.14; 369/47.41; 369/53.17; 369/53.24
(58) Field of Classification Search .............. 369/44.14, 369/44.23, 44.41, 47.15, 47.21, 53.17, 112.05, 369/112.1, 275.3, 275.1; 250/201.5; 359/1
See application file for complete search history.

(56) References Cited

U.S. PATENT DOCUMENTS

| | | | | | |
|---|---|---|---|---|---|
| 5,272,685 | A | * | 12/1993 | Ando | 369/44.14 |
| 5,644,556 | A | * | 7/1997 | Oikawa | 369/13.54 |
| 5,768,219 | A | * | 6/1998 | Yamamoto et al. | 369/13.24 |
| 6,125,083 | A | * | 9/2000 | Nishimura et al. | 369/13.46 |
| 6,418,098 | B1 | * | 7/2002 | Yamamoto et al. | 369/44.41 |
| 6,456,574 | B1 | * | 9/2002 | Kato | 369/47.21 |
| 6,577,565 | B1 | * | 6/2003 | Yanagawa et al. | 369/44.23 |
| 6,791,932 | B1 | * | 9/2004 | Maruyama | 369/112.05 |
| 6,898,169 | B2 | | 5/2005 | Kadowaki et al. | |
| 7,345,981 | B2 | | 3/2008 | Kim et al. | |
| 7,348,529 | B2 | * | 3/2008 | Ohyama | 250/201.5 |
| 7,835,251 | B2 | * | 11/2010 | Ohyama | 369/112.1 |
| 2002/0054561 | A1 | * | 5/2002 | Inase et al. | 369/275.3 |
| 2005/0276212 | A1 | * | 12/2005 | Kato et al. | 369/275.1 |
| 2007/0188835 | A1 | * | 8/2007 | Ohyama | 359/1 |
| 2008/0101202 | A1 | * | 5/2008 | Nishimoto et al. | 369/112.07 |
| 2009/0010122 | A1 | * | 1/2009 | Ogata et al. | 369/53.17 |

FOREIGN PATENT DOCUMENTS

| | | |
|---|---|---|
| JP | 2005-203090 | 7/2005 |
| JP | 2006-344380 | 12/2006 |
| WO | WO 2008/132891 A1 | 11/2008 |

OTHER PUBLICATIONS

Office Action issued Aug. 23, 2011, in Japanese Patent Application No. 2007-253423.

* cited by examiner

*Primary Examiner* — Thuy Pardo
(74) *Attorney, Agent, or Firm* — Oblon, Spivak, McClelland, Maier & Neustadt, L.L.P.

(57) ABSTRACT

An optical pickup apparatus capable of irradiating an optical recording medium having a plurality of recording layers on which a signal is recorded with laser light includes a light source emitting the laser light, a light-concentrating element concentrating the laser light emitted from the light source on the optical recording medium, a phase difference element having a region divided into at least two regions which the laser light reflected by the optical recording medium enters and producing a phase difference between first light and second light reflected by a non-target layer which is not a target of recording or reproduction of the signal out of the plurality of recording layers and entering the at least two regions such that the first and the second light weaken each other, and a photodetector receiving the laser light emitted from the phase difference element.

15 Claims, 12 Drawing Sheets

| | | Example 1 | | Example 2 | |
|---|---|---|---|---|---|
| Region | | Region L | Region M | Region L | Region M |
| Material | | Crystal | Quartz | Crystal | White Sheet |
| Refractive Index | $n_{Lp}, n_{Mp}$ | 1.557 | 1.468 | 1.557 | 1.540 |
| | $n_{Ls}, n_{Ms}$ | 1.567 | 1.468 | 1.567 | 1.540 |
| Outward Path | $\|n_{Lp} - n_{Mp}\|$ | 0.089 | | 0.017 | |
| | $\lambda/h$ | 405/22600 | | 405/22900 | |
| | $\alpha$ | 5 | | 1 | |
| | Phase Difference | $2\pi$ | | $2\pi$ | |
| Return Path | $\|n_{Ls} - n_{Ms}\|$ | 0.099 | | 0.027 | |
| | $\lambda/(h/2)$ | 405/22600/2 | | 405/22900/2 | |
| | $\beta$ | 11 | | 3 | |
| | Phase Difference | $\pi$ | | $\pi$ | |

|  | Example 1 | | Example 2 | |
|---|---|---|---|---|
| Region | Region L | Region M | Region L | Region M |
| Material | Crystal | Quartz | Crystal | White Sheet |
| Refractive Index $n_{Lp}, n_{Mp}$ | 1.557 | 1.468 | 1.557 | 1.540 |
| Refractive Index $n_{Ls}, n_{Ms}$ | 1.567 | 1.468 | 1.567 | 1.540 |
| Outward Path $\|n_{Lp} - n_{Mp}\|$ | 0.089 | | 0.017 | |
| Outward Path $\lambda/h$ | 405/22600 | | 405/22900 | |
| Outward Path $\alpha$ | 5 | | 1 | |
| Outward Path Phase Difference | $2\pi$ | | $2\pi$ | |
| Return Path $\|n_{Ls} - n_{Ms}\|$ | 0.099 | | 0.027 | |
| Return Path $\lambda/(h/2)$ | 405/22600/2 | | 405/22900/2 | |
| Return Path $\beta$ | 11 | | 3 | |
| Return Path Phase Difference | $\pi$ | | $\pi$ | |

FIG.5

OPTICAL PICKUP APPARATUS, OPTICAL RECORDING MEDIUM DRIVING APPARATUS, AND SIGNAL RECORDING/REPRODUCING METHOD

CROSS REFERENCES TO RELATED APPLICATIONS

The present invention contains subject matter related to Japanese Patent Application JP 2007-253423 filed in the Japanese Patent Office on Sep. 28, 2007, the entire contents of which being incorporated herein by reference.

BACKGROUND OF THE INVENTION

1. Field of the Invention

The present invention relates to an optical pickup apparatus recording a signal on an optical recording medium or reproducing a recorded signal, an optical recording medium driving apparatus equipped with the same, and a signal recording/reproducing method.

2. Description of the Related Art

Among optical disks serving as optical recording mediums, there has been a disk having two recording layers on one side. Hereinafter, this optical disk is referred to as a dual-layer disk for convenience. When this dual-layer disk is used, reflected light from a target layer which is a target of recording or reproduction out of two recording layers of this dual-layer disk and reflected light from an adjacent layer which is not the target layer enter a detector for photoelectric conversion. In this case, since the power (or light intensity) of the reflected light from the adjacent layer is sufficiently lower than the power of the reflected light from the target layer, the interference with each reflected light in the detector is insignificant. Also in this case, since a main beam from the adjacent layer is not focused on the detector, the beam diameter thereof is increased near the detector (see, for example, Japanese Patent Application Laid-open No. 2005-203090 (paragraph [0098], and so on) (hereinafter, referred to as Patent Document 1)).

Incidentally, in a three-beam method used for tracking control, laser light from a laser light source is separated into three beams: a main beam being zero-order diffracted light and sub-beams being positive and negative first-order diffracted light. The sub-beam is detected by a sub-detector different from the detector for detecting the main beam. A tracking error signal which is a DPP (Differential Push-Pull) signal is obtained by a predetermined calculation formula using push-pull signal values of these main beam and two sub-beams. Generally, the power of the main beam is supposed to be approximately 10 times to 20 times as large as that of the sub-beam.

When this three-beam method is used for the recording or reproduction of the above-mentioned dual-layer disk, the following problem arises. Specifically, the power of the sub-beam from the target layer is relatively close to the power of the main beam from the adjacent layer, and hence the interference or the like becomes marked. This interference causes variations in the power of light entering the sub-detector. Further, since an objective lens moves in a tracking direction by tracking control, the interference portion thereof oscillates, and consequently, fluctuation of the tracking error signal occurs.

To solve this problem, the above-mentioned Patent Document 1 discloses a technique in which part of the main beam from the adjacent layer is diffracted by a hologram region provided in an optical member and the diffracted light does not enter the detector. The part of the main beam diffracted by the hologram region goes to the outside of a spot of the main beam in the detector. In consequence, a hole is formed in the spot of the main beam from the adjacent layer. The placement, shape, and so on of the hologram region are set such that the hole overlaps with the main detector and the sub-detectors. This prevents the main beam and sub-beams from the target layer from interfering with the main beam from the adjacent layer.

As another technique to solve the above-mentioned problem, there is disclosed a technique in which the area of a spot of the sub-beam in the recording layer of the optical disk is set larger than that of the spot of the main beam (see, for example, Japanese Patent Application Laid-open No. 2006-344380 (Paragraph [0036]) (hereinafter, referred to as Patent Document 2)). A grating pattern of a diffraction grating which generates three beams have predetermined regularity, whereby a spot of a sub-beam becomes larger. When the spot of the sub-beam becomes larger, the energy of the sub-beam is dispersed, and the interference between the sub-beam and the main beam from an adjacent layer is suppressed.

SUMMARY OF THE INVENTION

However, in Patent Document 1, it is necessary to form the hole having at least the same area as a light-receiving surface of the detector, and hence the area of the hole needs to be set larger than the light-receiving surface of the detector when the oscillation of the objective lens in a tracking direction by a servo is considered.

Further, in Patent Document 1, holes (which cannot be seen because they are small) are made in even L11_zero-order light and L11_positive and negative first-order light reflected from the target layer. Accordingly, the power to obtain an RF signal for reproduction is reduced, and the MTF (Modulation Transfer Function) is greatly changed. This causes a problem that the signal recording or reproducing performance deteriorates, whereby in Patent Document 1, an auxiliary photodetector is provided, and a detection signal detected by this auxiliary photodetector and a detection signal detected by a main photodetector are added up.

However, since the auxiliary photodetector is necessary in this case, the size and cost of the optical pickup increase. Moreover, with the increase of light-receiving region, the signal band decreases, and consequently this technique is not suitable for high-speed recording and high-speed transfer. Further, the hole of the zero-order light needs to be located at an exact position on the photodetector. That is to say, two-dimensional hole alignment is necessary. Therefore, at least the optical member and the photodetector are required to be aligned with high precision, and consequently manufacturing is not easy.

In Patent Document 2, the increase in the area of the spot of the sub-beam in the recording layer of the optical disk causes the following problem. For example, when a pit formed in the recording layer of the optical disk and a boundary region where no pit is formed are irradiated with a beam, a push-pull signal itself fluctuates. In this case, there occurs a great difference between the fluctuation amount of a main beam push-pull (MPP) signal and the fluctuation amount of a sub-beam push-pull signal (SPP). As result, large fluctuation occurs to a DPP signal, that is, a tracking error signal.

In view of the above-mentioned circumstances, it is desirable to provide an optical pickup apparatus, an optical disk driving apparatus, and a signal recording/reproducing method capable of preventing light from a target layer which is a target of recording or reproduction of a signal of an optical recording medium having a plurality of recording layers from receiving the influence of light from a non-target layer on the photodetector.

It is further desirable to provide a technique of an optical pickup apparatus or the like in which the increase of the size and cost of the optical pickup apparatus is prevented and in which high-precision alignment or the like during the manufacturing thereof is unnecessary.

According to an embodiment of the present invention, there is provided an optical pickup apparatus capable of irradiating an optical recording medium having a plurality of recording layers on which a signal is recorded with laser light. The optical pickup apparatus includes a light source, a light-concentrating element, a phase difference element, and a photodetector. The light source emits the laser light. The light-concentrating element concentrates the laser light emitted from the light source on the optical recording medium. The phase difference element has a region divided into at least two regions which the laser light reflected by the optical recording medium enters and produces a phase difference between first light and second light reflected by a non-target layer which is not a target of recording or reproduction of the signal out of the plurality of recording layers and entering the at least two regions such that the first and the second light weaken each other. The photodetector receives the laser light emitted from the phase difference element.

The laser light reflected by a target layer which is the target of recording or reproduction out of the plurality of recording layers enters the photodetector through the phase difference element and is converted into an electrical signal for recording or reproduction by the photodetector. On the other hand, even if the first light and the second light act so as to weaken each other and the weakened light enters the photodetector, the laser light reflected by the target layer is not affected. In other words, the laser light reflected by the target layer becomes less likely to be affected by the laser light reflected by the non-target layer on the photodetector. As a result, for example, the fluctuation of a tracking error signal by a DPP method can be prevented.

In the embodiment of the present invention, in addition to the prevention of the fluctuation of the tracking error signal, main beams reflected by recording layers adjacent to each other can be prevented from affecting each other. When one recording medium has three or more recording layers and the distance between recording layers becomes shorter in the future, laser lights from different recording layers are expected to be more liable to interfere with each other regardless of the difference between the main beam and the sub-beam, that is, regardless of whether or not a three-beam method is adopted. In the embodiment of the present invention, such a problem can be also solved.

Moreover, in the embodiment of the present invention, the increase of the size and cost of the optical pickup apparatus which is cited as the problem of the above-mentioned Patent Document 1 is prevented, and also the high-precision alignment or the like during manufacturing is unnecessary.

It is only necessary that the phase difference element be so configured that at least respective parts of the first light and the second light weaken each other. In this case, the beam spot of the laser light from the non-target layer is not focused on the photodetector and has a larger area than the light-receiving surface.

The light-concentrating element refers to an objective lens or an optical system or the like mounted in an actuator or the like moving integrally with the objective lens.

"The first light and the second light weaken each other" also includes the meaning that the first light and the second light cancel each other out.

In the embodiment of the present invention, the optical pickup apparatus further includes a dividing element dividing the laser light emitted from the light source into a main beam and a sub-beam to generate a tracking error signal, and the phase difference element produces the phase difference between the first and the second light of the main beam reflected by the non-target layer. Consequently, a bad influence due to the interference on the photodetector between the sub-beam from the target layer out of the plurality of recording layers and the main beam from the non-target layer can be reduced. As a result, the fluctuation of the tracking error signal can be suppressed.

The phase difference element produces the phase difference of $\pi$[rad] between the first light and the second light. Consequently, the first light and the second light are substantially cancelled out, and the photodetector can practically detect only the laser light from the target layer.

For example, as the phase difference element, a polarization-selective element is used. The term "polarization" here may be circular polarization or linear polarization.

In the embodiment of the present invention, the optical pickup apparatus further includes a polarization beam splitter placed on an optical path of the laser light, and a $\lambda/4$ plate placed on the optical path between the polarization beam splitter and the light-concentrating element. The polarization beam splitter and the $\lambda/4$ plate constitute an optical system separating a path of the laser light going from the light source to the optical recording medium (hereinafter referred to as an outward path) and a path of the laser light from the optical recording medium to the photodetector (hereinafter referred to as a return path).

In the embodiment of the present invention, the phase difference element is placed on the optical path between the polarization beam splitter and the $\lambda/4$ plate and produces the phase difference according to a state of linearly polarized light of the laser light. Since the states of the linearly polarized light of the laser light in the outward path and the return path are different, that is, the directions of the linearly polarized light in the outward and the return path are different, the phase difference element can produce a phase difference, for example, in the laser light in the return path.

For example, the phase difference element is an element having a first material including a first region out of the at least two regions, and a second material including a second region out of the at least two regions, the second material being different from the first material. That is to say, the phase difference element is realized by an element performing the action of birefringence in which light emitted from the first region becomes ordinary light (or extraordinary light) and light emitted from the second region becomes extraordinary light (or ordinary light).

In the embodiment of the present invention, the phase difference element may be a liquid crystal element.

The liquid crystal element produces the phase difference by making the liquid crystal driving voltage different between the first region and the second region. Consequently, when laser lights of a plurality of wavelengths are used as the laser light, the phase difference element can support the laser lights of the plurality of wavelengths. In this case, the light source is capable of emitting a plurality of laser light beams having the plurality of wavelengths, respectively.

In the embodiment of the present invention, the phase difference element is placed on an optical path between the polarization beam splitter and the photodetector. In the embodiment of the present invention, the laser light in the outward path does not pass through and the laser light in the return path passes through the phase difference element, and hence the design of the phase difference element is facilitated. For example, the phase difference element is a plate material configured such that the thickness thereof in an optical axis direction of the optical path differs between the at least two regions.

In the embodiment of the present invention, the phase difference element has, as the region, a region divided into six regions constituted of a region divided into three regions in a first direction within a plane perpendicular to an optical axis direction of the laser light and a region divided into three regions in a second direction orthogonal to the first direction in the perpendicular plane. Consequently, for example, when the first direction is a longitudinal direction and the second direction is a lateral direction, the laser lights from the non-target layer weaken each other horizontally and vertically. In other words, the laser lights can be efficiently and substantially cancelled out.

According to an embodiment of the present invention, there is provided an optical recording medium driving apparatus driving an optical recording medium having a plurality of recording layers on which a signal is recorded. The optical recording medium driving apparatus includes an optical pickup and a recording/reproducing processor. The optical pickup has a light source emitting laser light, a light-concentrating element concentrating the laser light emitted from the light source on the optical recording medium, a phase difference element having a region divided into at least two regions which the laser light reflected by the optical recording medium enters and producing a phase difference between first light and second light reflected by a non-target layer which is not a target of recording or reproduction of the signal out of the plurality of recording layers and entering the at least two regions such that the first and the second light weaken each other, and a photodetector receiving the laser light emitted from the phase difference element. The recording/reproducing processor performs at least one of recording of the signal on the optical recording medium and reproduction of the signal recorded on the optical recording medium by using the optical pickup.

A signal recording/reproducing method according to an embodiment of the present invention includes emitting laser light, concentrating the emitted laser light on an optical recording medium having a plurality of recording layers on which a signal is recorded, producing, by causing the laser light reflected by a non-target layer which is not a target of recording or reproduction of the signal out of the plurality of recording layers to enter a region divided into at least two regions of a phase difference element, a phase difference between first light and second light which have entered the at least two regions, respectively, such that the first and the second light weaken each other, receiving the laser light emitted from the phase difference element, and performing at least one of recording of the signal on the optical recording medium and reproduction of the signal recorded on the optical recording medium on the basis of the received laser light.

As described above, according to the embodiments of the present invention, light from a target layer which is a target of recording or reproduction of a signal of an optical recording medium having a plurality of recording layers can be prevented from being affected on a photodetector by light from a non-target layer.

These and other objects, features and advantages of the present invention will become more apparent in light of the following detailed description of best mode embodiments thereof, as illustrated in the accompanying drawings.

BRIEF DESCRIPTION OF DRAWINGS

FIG. 5 is a table showing specific examples for realizing the phase difference element;

DESCRIPTION OF PREFERRED EMBODIMENTS

Embodiments of the present invention will be described below with reference to the drawings.

Figure 1:
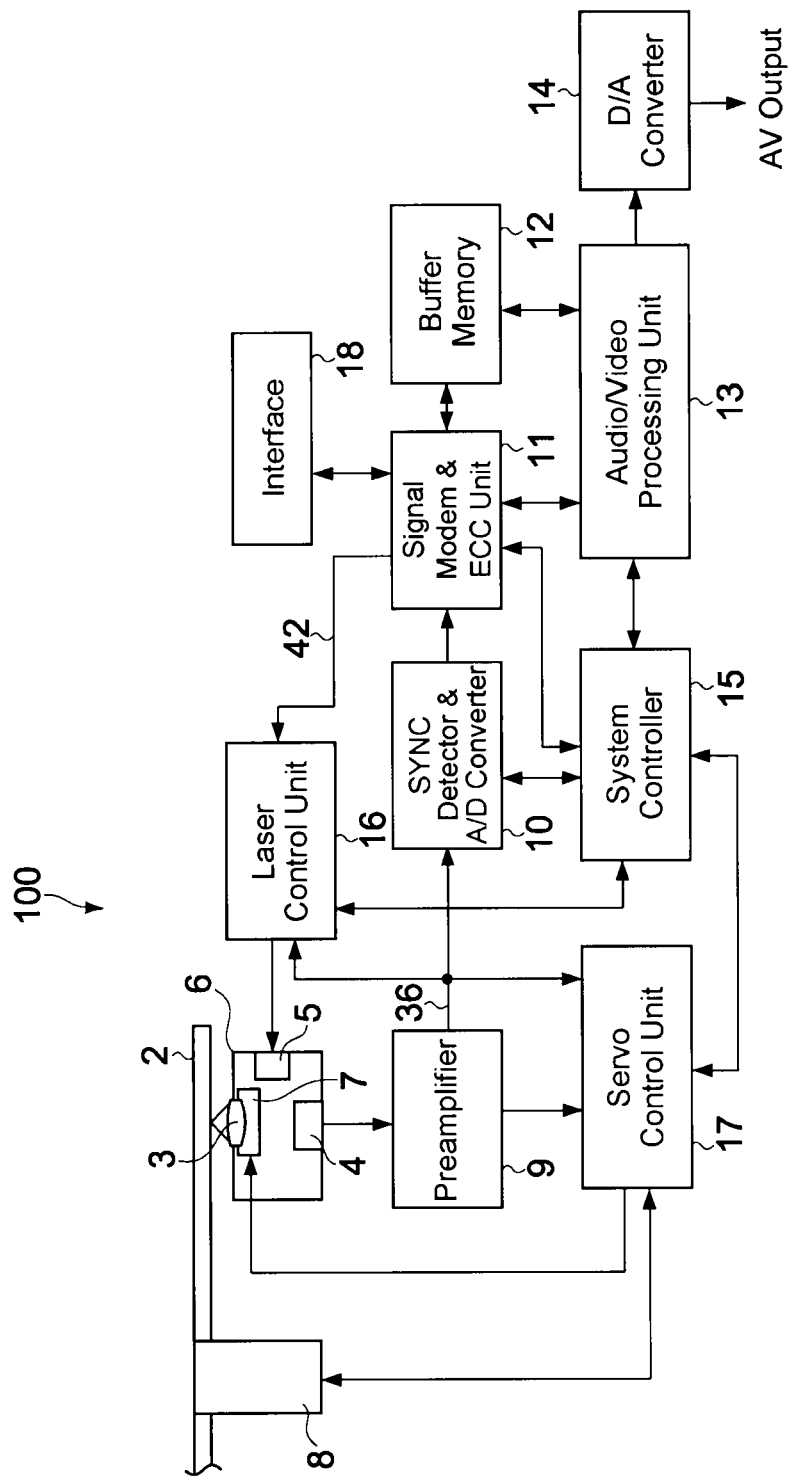
FIG. 1 is a block diagram showing a configuration of an optical disk driving apparatus according to an embodiment of the present invention.

FIG. 1 is a block diagram showing a configuration of an optical disk driving apparatus according to an embodiment of the present invention.

An optical disk driving apparatus 100 includes a spindle motor 8, an optical pickup 6, a preamplifier 9, a triaxial actuator 7, and a servo control unit 17.

The spindle motor 8 rotationally drives an optical recording medium (hereinafter referred to as an optical disk) 2 such as DVD±R/RW, CD-R/RW, or BD (Blu-ray Disc (registered trademark)).

The optical pickup 6 has a laser light source 5, an objective lens 3 which concentrates laser light emitted from the laser light source 5 on the optical disk 2, a photodetector (PD) 4 which detects reflected return light from the optical disk 2, the triaxial actuator 7, and so on. Examples of the laser light source 5 include, but are not limited to, a laser diode (LD) which is typically used. An optical system of the optical pickup 6 will be described in detail later.

The triaxial actuator 7 moves the portion of the objective lens 3 of the optical pickup 6 in a tracking direction, a focusing direction, and a tilt direction. The actuator driving the objective lens 3 is not limited to the triaxial actuator 7 and may be a biaxial actuator in the tracking direction and the focusing direction.

The preamplifier 9 generates a focus error signal, a tracking error signal, an RF signal, and so on, on the basis of various signals outputted from the PD 4 of the optical pickup 6. The servo control unit 17 outputs various servo signals to the triaxial actuator 7 and the spindle motor 8 on the basis of the focus error signal, the tracking error signal, and the RF signal.

The optical disk driving apparatus 100 further includes a thread motor (not shown) for moving the optical pickup 6 in the radial direction of the optical disk 2. The servo control unit 17 outputs a servo signal also to the thread motor.

The optical disk driving apparatus 100 includes a system controller 15, a laser control unit 16, a SYNC detector & A/D converter 10, a signal modem & ECC (Error Correction Code) unit 11, a buffer memory 12, an audio/video processing unit 13, a D/A converter 14, and an interface 18. A recording/reproducing processor is constituted by at least the above-mentioned preamplifier 9, laser control unit 6, servo control unit 17, SYNC detector & A/D converter 10, signal modem & ECC unit 11, audio/video processing unit 13, and system controller 15.

The system controller 15 collectively controls the entire optical disk driving apparatus 100 by inputting and outputting various signals.

The laser control unit 16 receives a modulation signal 42 from the signal modem & ECC unit 11 and modulates laser power of the laser light source 5 to write the signal to the optical disk 2, or controls the laser power on the basis of the RF signal.

The SYNC detector & A/D converter 10 generates a clock on the basis of SYNC signals recorded on the optical disk 2 at predetermined intervals and converts an analog signal into a digital signal.

The signal modem & ECC unit 11 performs signal modulation and demodulation, addition of an ECC, and error correction processing on the basis of the ECC.

The buffer memory 12 temporarily stores data during the processing in the signal modem & ECC unit 11.

The audio/video processing unit 13 performs necessary video processing and audio processing and outputs video and audio in an analog form via the D/A converter 14.

The interface 18 is an interface to connect with an external computer, an audio/video source, and so on (not shown).

The optical disk driving apparatus is not limited to have the configuration of the optical disk driving apparatus 100 described above, and may have another publicly known configuration. The above-mentioned optical disk driving apparatus 100 is described as an apparatus capable of performing both recording and reproduction, but may be an apparatus to perform either of them.

Figure 2:
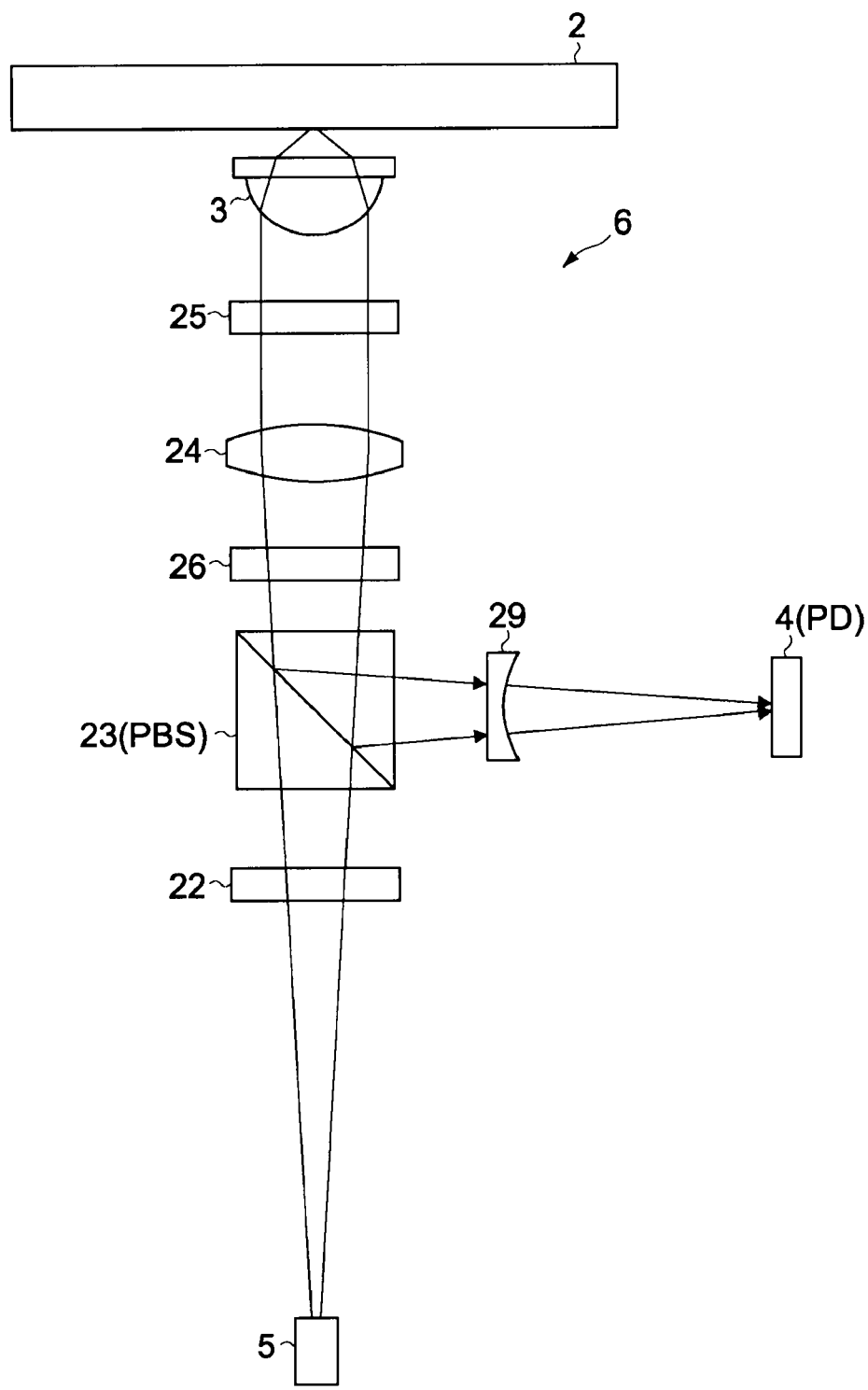
FIG. 2 is a diagram showing an optical system of an optical pickup according to the embodiment of the present invention.

FIG. 2 is a diagram showing the optical system of the optical pickup 6 according to the embodiment of the present invention.

The optical pickup 6 includes the laser light source 5, a diffraction grating (dividing element) 22, a polarization beam splitter (PBS) 23, a phase difference element 26, a collimator lens 24, a λ/4 plate 25, the objective lens 3, a cylindrical lens 29, and the PD 4.

The diffraction grating 22 divides the laser light emitted from the laser light source 5 into a zero-order main beam and positive and negative first-order sub-beams.

The PBS 23 converts the laser light (main beam and sub-beams) outputted from the diffraction grating 22 into lineally polarized light (for example, p-polarized light) in a predetermined direction and outputs the linearly polarized light. The λ/4 plate 25 has a function of converting the linearly polarized light into circularly polarized light and the circularly polarized light into the linearly polarized light. The circularly polarized light in an outward path is reflected by the optical disk 2 and becomes circularly polarized light opposite in direction (rotating in a reverse direction) in a return path. Accordingly, the circularly polarized light opposite in direction is inputted to the λ/4 plate 25, and linearly polarized light (s-polarized light) in a direction orthogonal to the p-polarized light in the outward path is outputted from the λ/4 plate 25. Moreover, in the return path, the PBS 23 causes the s-polarized light to be reflected by its inner mirror portion and enter the cylindrical lens 29.

Since the displacement among optical paths of the three beams divided by the diffraction grating 22 is very small in FIG. 2, for example, only the zero-order main beam is depicted as a representative of the laser light.

The phase difference element 26 substantially transmits the laser light in the outward path outputted from the PBS 23 and takes predetermined action for the laser light in the return path. The phase difference element 26 will be described in detail later.

The collimator lens 24 converts diffused light outputted from the phase difference element 26 into parallel light.

The cylindrical lens 29 gives astigmatism to the laser light outputted from the PBS 23, for example, for focus control by an astigmatic method. The lens which gives astigmatism is not limited to the cylindrical lens 29, and other lenses may also be used.

Figure 3:
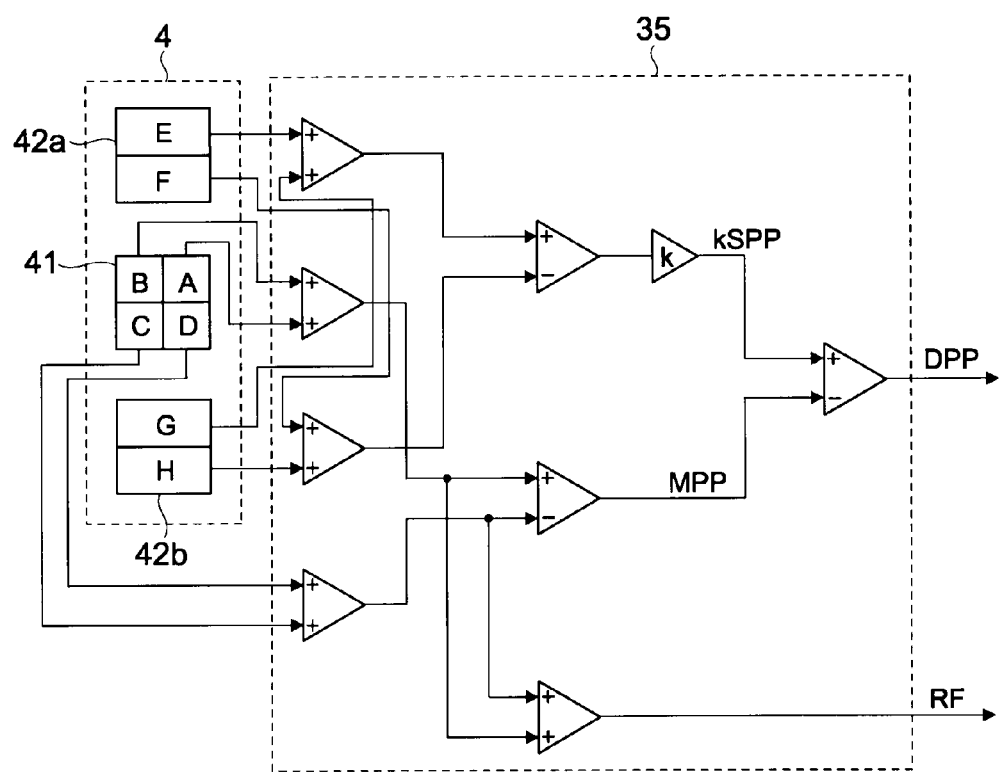
FIG. 3 is a schematic view showing a configuration of a photodetector.

FIG. 3 is a schematic view showing a configuration of the PD 4.

The PD 4 has a main photodetector (MPD) 41 and two sub-photodetectors (SPD 42a and SPD 42b). The MPD 41 detects the main beam out of three beams divided by the diffraction grating 22. The SPDs 42a and 42b detect two sub-beams. Signals corresponding to powers of the respective beams detected by the MPD 41 and SPDs 42a and 42b are subjected to predetermined computation processing by a signal computation unit 35. The signal computation unit 35 is a circuit included in the optical disk driving apparatus 100. The RF signal, a main push-pull (MPP) signal, a sub push-pull signal (SPP), and a DPP signal for reproduction are generated by the signal computation unit 35.

The RF, MPP, SPP, and DPP signals are typically represented by the following expressions (1) to (4). The DPP signal or a signal obtained by subjecting the DPP signal to a predetermined computation process becomes the tracking error signal. Alternatively, the MPP signal and the SPP signal are subjected to predetermined computation processes in some cases. Therefore, the expressions (1) to (3) are merely basic expressions.

$$RF=A+B+C+D \qquad (1)$$

$$MPP=(A+B)-(C+D) \qquad (2)$$

$$SPP=(E+G)-(F+H) \qquad (3)$$

$$DPP=MPP-kSPP \qquad (4)$$

It should be noted that the focus error (FE) signal using the astigmatic method is given by the following expression (5) although not shown in the signal computation unit 35 in FIG. 3.

$$FE=(A+C)-(B+D) \qquad (5)$$

Figure 4A:
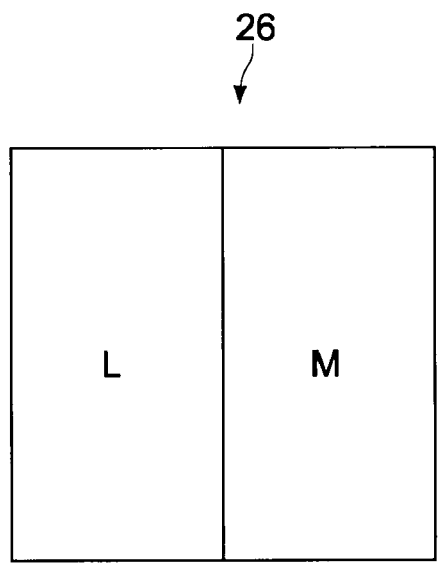
FIGS. 4A and 4B are schematic views of a phase difference element.
Figure 4B:
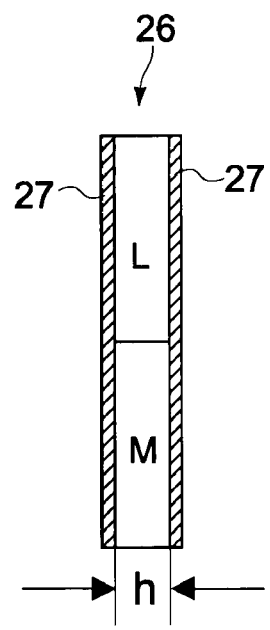

FIG. 4A is a schematic view of the phase difference element 26 viewed in the direction of an optical axis of the laser light. FIG. 4B is a schematic view of the phase difference element 26 viewed in a plane parallel to the optical axis.

The phase difference element 26 includes two regions L and M (a first and a second region) typically bilaterally or vertically symmetric with respect to the optical axis. The phase difference element 26, for example, substantially transmits the p-polarized light and with respect to the s-polarized light, produces a phase difference between light (first light) passing through the region L and light (second light) passing through the region M. Accordingly, with respect to the laser light in the return path which is the s-polarized light, the phase difference element 26 produces the phase difference between the respective lights passing through the regions L and M. In other words, the phase difference element 26 has polarization selectivity to produce a phase difference according to the state of the linearly polarized light. When the PBS 23 is configured to output, for example, the p-polarized light in the outward path, it is only necessary that the phase difference element 26 be configured to produce a phase difference in the laser light in the return path which is the s-polarized light.

Next, the principle and configuration example of this phase difference element 26 will be described in detail.

Examples of the phase difference element 26 include an element having birefringence. A birefringent element is an element which converts incident light into two linearly polarized lights (ordinary light and extraordinary light) having different planes of vibration, and a phase difference occurs between the ordinary light and the extraordinary light. The definitional equation of the phase difference (depending on the wavelength of light) $\delta$[rad] of the birefringent element is represented by the following expression (6) or (7).

$$\delta(\lambda) = 2\pi(n_e - n_0)h/\lambda \quad (6)$$

$$\delta(\lambda) = 2\pi(n-1)h/\lambda \quad (7)$$

$\delta$: phase difference
$n_e$: refractive index of medium with respect to extraordinary light
$n_0$: refractive index of medium with respect to ordinary light
n: refractive index of medium
h: thickness in optical axis direction of element
$\lambda$: wavelength of light Incidentally, in the expression (7), a birefringent element having two regions of a medium and air (or a vacuum) through which light passes is assumed.

Based on the above-mentioned principle of the birefringent element, the phase difference element 26 shown in FIGS. 4A and 4B is configured. Typically, the phase difference element 26 has cover glasses 27 formed on surfaces of the regions L and M as shown in FIG. 4B.

For example, in order to make the phase difference between the regions L and M equal to an integral multiple of $2\pi$ ($2\pi\alpha$ ($\alpha$: integer)) in the outward path, it is only necessary to use materials satisfying the following expression (8) or (9) as the phase difference element 26.

$$n_{Lp} = n_{Mp} \quad (8)$$

$$|n_{Lp} - n_{Mp}| = \alpha(\lambda/h) \quad (9)$$

$\alpha$: integer
$n_{Lp}$: refractive index of light (p-polarized light, for example) in region L in outward path
$n_{Mp}$: refractive index of light (p-polarized light, for example) in region M in outward path The expression (9) is calculated from the above-mentioned expression (6) by causing $\delta = 2\pi\alpha$ to be established Moreover, in order to make the phase difference between the regions L and M equal to an odd multiple of $\pi$ ($\pi\beta$ ($\beta$: odd number)) in the return path, it is only necessary to use materials satisfying the following expression (10), which is obtained by letting $\delta = \pi\beta$ in the above-mentioned expression (6), as the phase difference element 26.

$$|n_{Ls} - n_{Ms}| = \beta\lambda/(2h) \quad (10)$$

$\beta$: odd number
$n_{Ls}$: refractive index of light (s-polarized light, for example) in region L in return path
$n_{Ms}$: refractive index of light (s-polarized light, for example) in region M in return path As described above, it is only necessary to use materials satisfying both the expressions (9) and (10) or materials satisfying both the expressions (8) and (10) as the phase difference element 26.

FIG. 5 is a table showing specific examples for realizing the phase difference element 26. The examples of the phase difference element 26 are not limited to the examples shown in FIG. 5. As materials constituting the regions L and M respectively, birefringent materials other than crystal and quartz or materials other than white sheet glass having no birefringence may be used. Other examples of the birefringent material include lithium niobate, calcite ($CaCO_3$), CdS, $MgF_2$, and so on.

As described above, only the birefringent materials are not always used as the phase difference element 26. The phase difference element 26 is constituted by a combination of birefringent materials or a combination of a birefringent material and a material not having birefringence so as to exert different actions in the outward path and the return path.

Figure 6A:
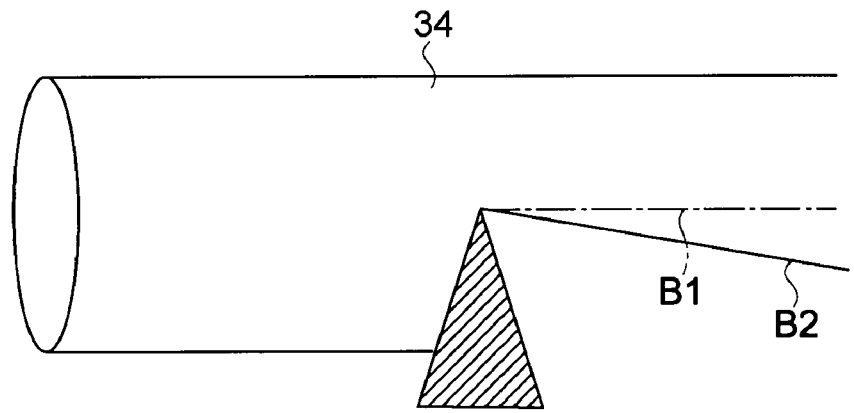
FIGS. 6A and 6B are schematic views for explaining the action of the phase difference element that produces a phase difference in laser light and weakens the power of the laser light.
Figure 6B:
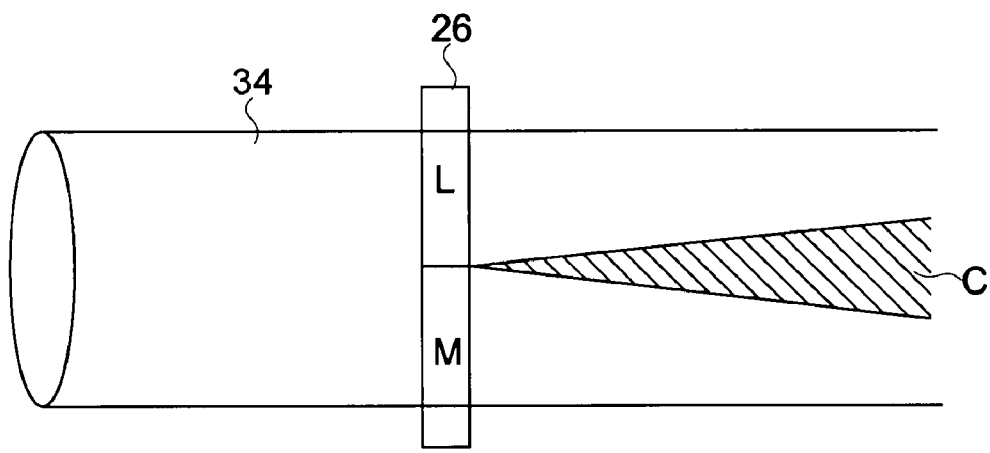

FIGS. 6A and 6B are schematic views for explaining the action of the phase difference element 26 that produces a phase difference in laser light and weakens the power of the laser light.

For example, as shown in FIG. 6A, if approximately half of a beam of laser light 34 is blocked by an object 36, the laser light geometrically-optically takes an optical path B1. However, actually, the laser light 34 travels so as to get behind the object 36 as shown by an optical path B2 because of a diffraction phenomenon.

As shown in FIG. 6B, in the laser light (s-polarized light in the return path in this embodiment) which has passed through the regions L and M of the phase difference element 26, a phase difference of n[rad] occurs between the regions L and M. According to the same principle as described in FIG. 6A, the laser light 34 which has passed through the region L gets behind the region M, and the laser light 34 which has passed through the region M gets behind the region L. In an overlapping region C of these two laser lights 34, the phase difference $\pi$ occurs as described above, so these two laser lights 34 weaken each other (which implies that they cancel each other out. Hereinafter, same as above) Consequently, by placing the PD 4 in a region which the overlapping region C of the laser light 34 enters, the PD 4 does not receive the laser light 34.

Figure 7A:
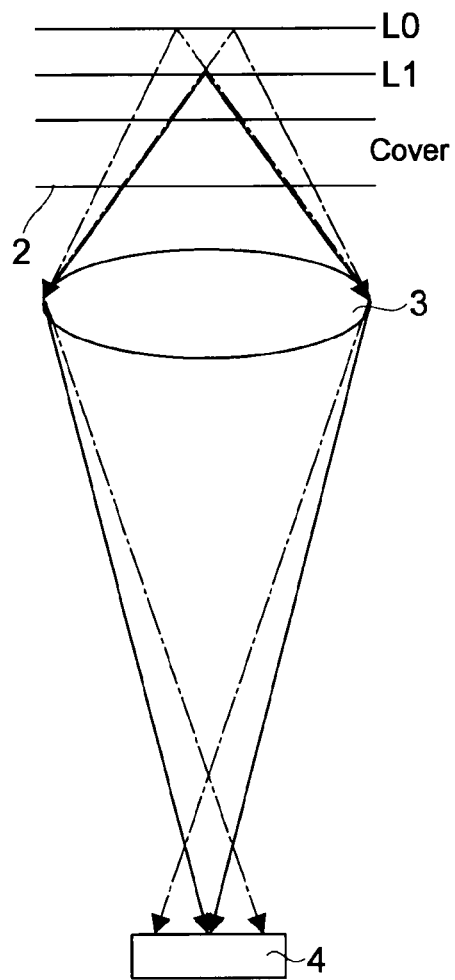
FIGS. 7A and 7B are diagrams showing states in which the laser light is focused on a target layer or a non-target layer.
Figure 7B:
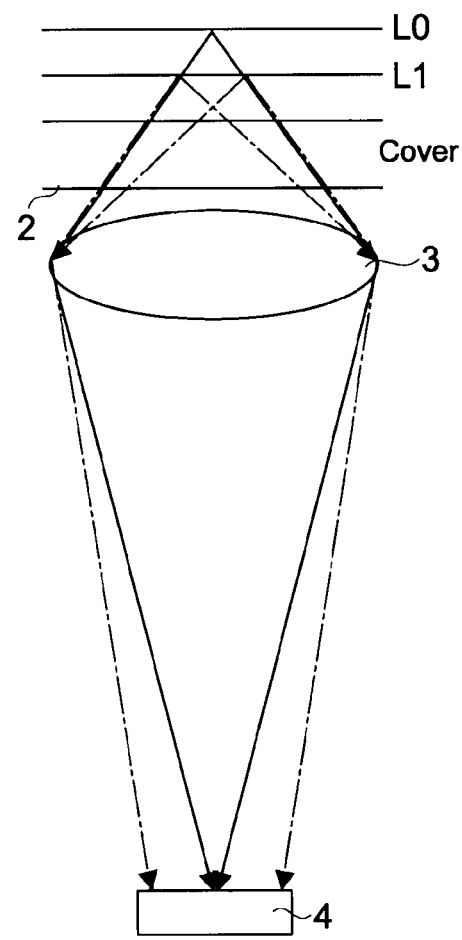

FIG. 7A shows a state in which when a target layer of recording or reproduction of the optical disk 2 is a layer L1 close to the objective lens 3, the laser light is concentrated on the layer L1. FIG. 7B shows a state in which when the target layer of recording or reproduction is a layer L0 farther from the objective lens 3, the laser light is concentrated on the layer L0.

In the case of FIG. 7A, since the target layer is the layer L1, the laser light focused on the layer L1 is transmitted by the layer L1, diffused, and enters the layer 0. This laser light is reflected by the layer L0 and temporarily focused in the middle of travelling in the return path through the objective lens 3. In other words, the laser light reflected by the layer L0 is focused on the front side of the PD 4.

On the other hand, in the case of FIG. 7B, since the target layer is the layer L0, the laser light is focused on the layer L0, but before that, part of the laser light is reflected by the non-target layer L1. The laser light reflected by the layer L1 travels in the return path through the objective lens 3. That is to say, the laser light reflected by the layer L1 is focused on the back side of the PD 4.

In either case of FIG. 7A and FIG. 7B, the laser light from the non-target layer, whose beam spot is large, enters the PD 4, and it is not focused on the PD 4.

As described above, the power of the main beam of the laser light from the non-target layer is relatively close to the power of the positive and negative first-order sub-beams, and hence the interference between these beams becomes a problem.

In this embodiment, however, when the laser light of the s-polarized light emitted from the λ/4 plate 25 has passed through the phase difference element 26 in the return path, part of the laser light is weakened or cancelled as described above.

Figure 8A:
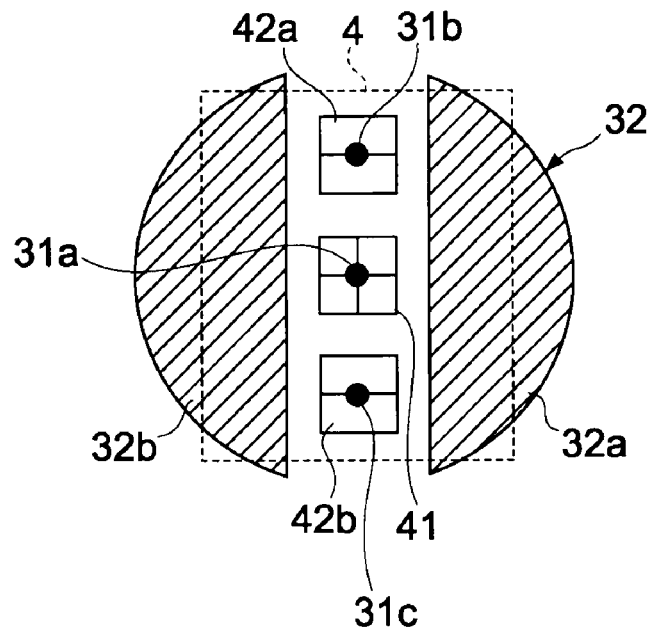
FIGS. 8A and 8B are diagrams for explaining the relationship between the laser light which has passed through the phase difference element and a light receiving region of the PD which this laser light enters.
Figure 8B:
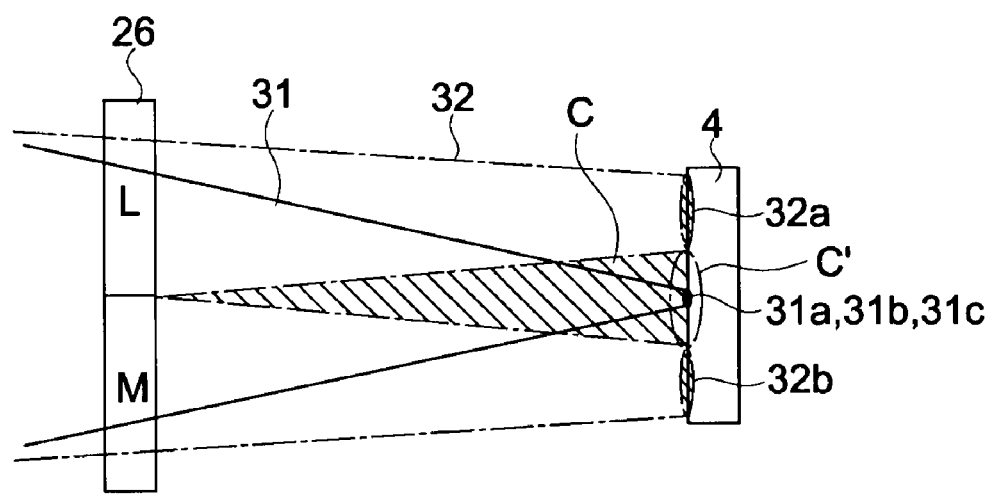

FIGS. 8A and 8B are diagrams for explaining the relationship between the laser light which has passed through the phase difference element 26 and a light receiving region of the PD 4 which this laser light enters. FIG. 8A is a diagram of the PD 4 viewed in the optical axis direction. FIG. 8B is a diagram viewed in a plane parallel to the optical axis.

Out of the laser light which has passed through the phase difference element 26, a beam 31 reflected from the target layer of the optical disk 2 is light which converges even when passing through the phase difference element 26, whereby the influence of the phase difference element 26 can be ignored. Out of the beam 31, a main beam 31a is focused on the MPD 41 and therefore the light thereof is detected. Moreover, out of the beam 31, sub-beams 31b and 31c are focused on the SPD 42a and the SPD 42b, respectively, and therefore the lights thereof are detected.

On the other hand, out of the laser light which has passed through the phase difference element 26, the overlapping portion C of the main beam 32 reflected from the non-target layer of the optical disk 2 is cancelled, and therefore, the main beam 32 does not enter the MPD 41, the SPD 42a, and the SPD 42b. That is to say, as shown in FIGS. 8A and 8B, the beam spot of the main beam 32 becomes a large beam spot whose center portion is cut out, and the main beam 32 is divided into beams 32a and 32b. A region with no light between the beams 32a and 32b (a region which weakened light enters) of the main beam 32 is called a region C'.

As a result, the sub-beams 31b and 31c from the target layer and the main beam 32 from the non-target layer do not interfere with each other. Accordingly, the fluctuation of the tracking error signal caused by a DPP method can be prevented.

Further, in this embodiment, as shown in FIG. 8B, the light in the region C is emitted from the phase difference element 26 and diffused. Accordingly, the region C' becomes larger than the size of a hole in the beam spot in the above-mentioned Patent Document 1. Consequently, for example, even when the objective lens 3 oscillates by a tracking servo or the like and these beams 31 and 32 move, there is no possibility that the sub-beams 31b and 31c from the target layer interfere with the main beam 32a or 32b from the non-target layer.

In this embodiment, in addition to the prevention of the fluctuation of the tracking error signal, the main beams reflected by recording layers adjacent to each other can be prevented from affecting each other. When one optical disk 2 has three or more recording layers and the distance between the recording layers becomes shorter in the future, laser lights from different recording layers are expected to be more liable to interfere with each other regardless of the difference between the main beam and the sub-beam, that is, regardless of whether a three-beam method is adopted. In this embodiment, this problem can be also solved.

In this embodiment, the increase in size and cost of the optical pickup 6 is prevented, and the need for high-precision alignment and the like during manufacturing is eliminated.

The phase difference element 26 is not limited to the element explained with reference to FIG. 4 and FIG. 5, and may be, for example, a liquid crystal element. The tilt of arranged liquid crystal molecules of the liquid crystal element can be changed according to the voltage distribution of driving voltage. Accordingly, when the phase difference element 26 is the liquid crystal element, light having a different refractive index can be locally transmitted according to the driving voltage. For example, in this case, it is only necessary that the voltage be driven such that the liquid crystal element produces a phase difference between the respective laser lights passing through the regions L and M shown in FIG. 4.

Even if the laser light source 5 is a light source emitting laser light beams of a plurality of wavelengths when the liquid crystal element is used as the phase difference element 26 as just described, the liquid crystal element can support the laser light beams of the plurality of wavelengths. That is to say, it is only necessary that the liquid crystal element adjust the driving voltage for each of the laser light beams of the plurality of wavelengths. The laser light beams of the plurality of wavelengths include, for example, blue laser light of about 400 nm, red laser light of about 650 nm to 780 nm, and laser light beams of other wavelengths.

Figure 9:
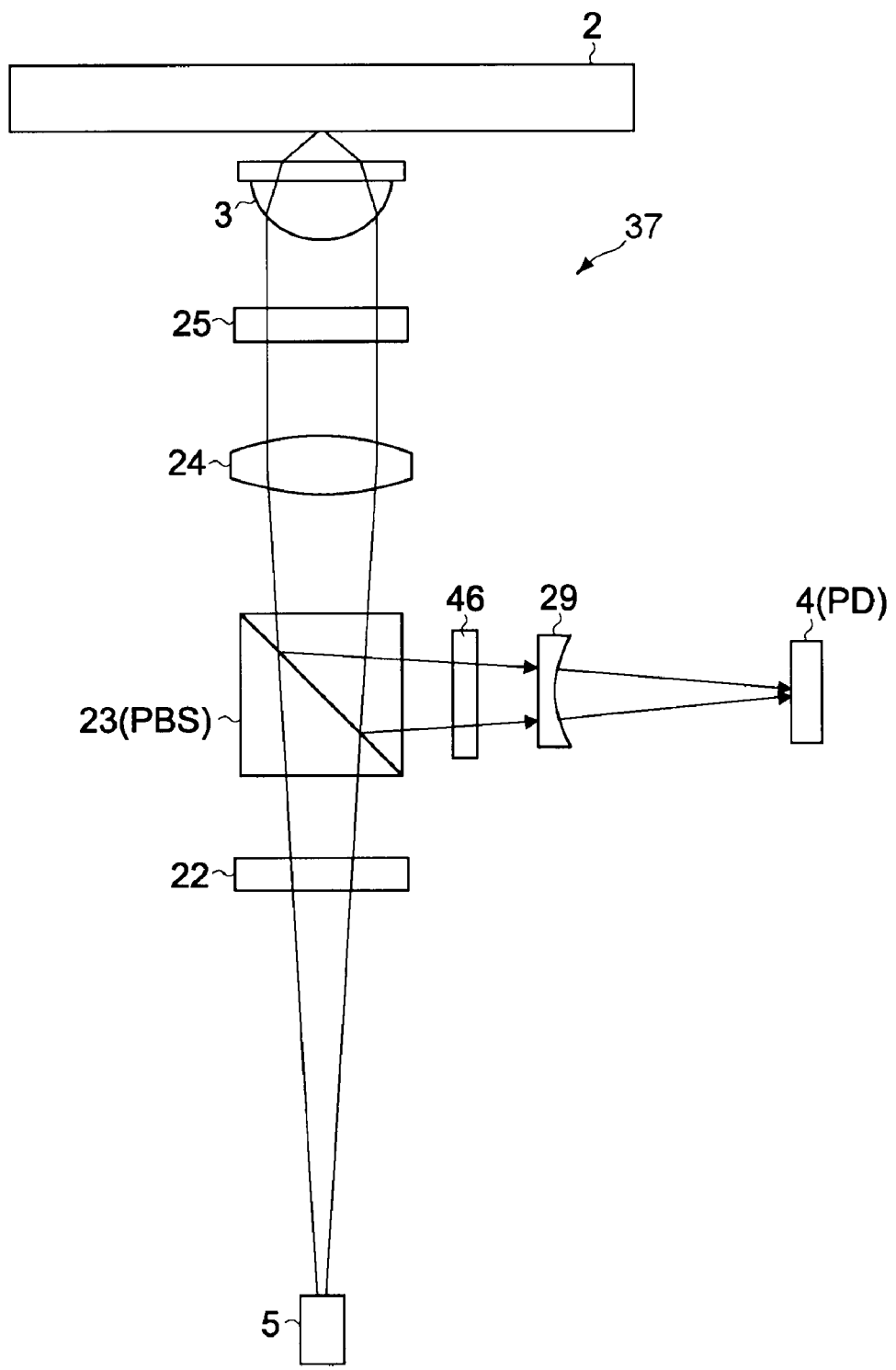
FIG. 9 is a diagram showing an optical system of an optical pickup according to another embodiment of the present invention.

FIG. 9 is a diagram showing an optical system of an optical pickup according to another embodiment of the present invention. The optical system of this optical pickup 37 differs from the optical system of the optical pickup shown in FIG. 2 in the placement of a phase difference element.

A phase difference element 46 is placed on an optical path between the PBS 23 and the cylindrical lens 29. The longer the optical path length between the phase difference element 46 and the PD 4, the better. This is because, as can be seen from FIG. 8B, as the phase difference element 46 becomes closer to the PD 4, the area of the region C' becomes smaller. However, it is possible to place the phase difference element 4 between the cylindrical lens 29 and the PD 4 if the area of the region C' can be a desired area.

By placing the phase difference element 46 on the optical path between the PBS and the PD 4 as just described, the laser light in the outward path does not pass through the phase difference element 46 but the laser light in the return path passes through the phase difference element 46, and hence unlike the above embodiment, it is unnecessary to take the difference in polarization state into account. Hence, the design of the phase difference element 46 is facilitated, leading to a reduction in cost. In this case, the phase difference element 46 is typically constituted in the following manner.

Figure 10:
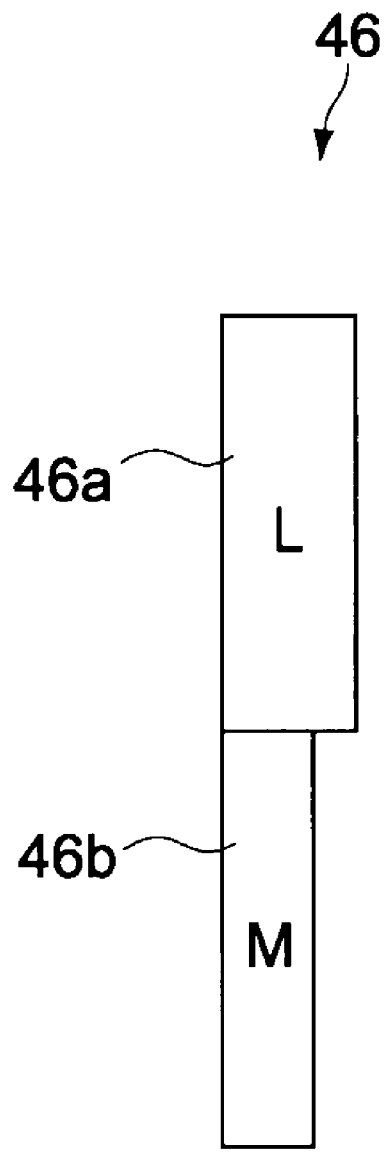
FIG. 10 is a schematic view of a phase difference element viewed in a plane parallel to an optical axis in FIG. 9.

FIG. 10 is a schematic view of the phase difference element 46 viewed in a plane parallel to the optical axis. It is only necessary that a plate material in which plates having different thicknesses in the optical axis direction are placed in the regions L and M respectively be provided as the phase difference element 46. It is only necessary that the thicknesses of plates 46a and 46b placed in the regions L and M respectively be set to such thicknesses that the phase difference π[rad] occurs between laser lights passing through the regions L and M.

The plates 46a and 46b may be made of the same material or different materials. The materials may be but not limited to a birefringent material, and may be glass, resin, and other materials which transmit the laser light. Consequently, the cost can be reduced as compared to the case where the birefringent material is used.

Alternatively, either one of the regions L and M may be a gas layer (or vacuum layer). Consequently, the phase difference element can be formed thinner, and, for example, even if the optical path between the PBS 23 and the cylindrical lens 29 is short, this phase difference element can be placed.

Figure 11:
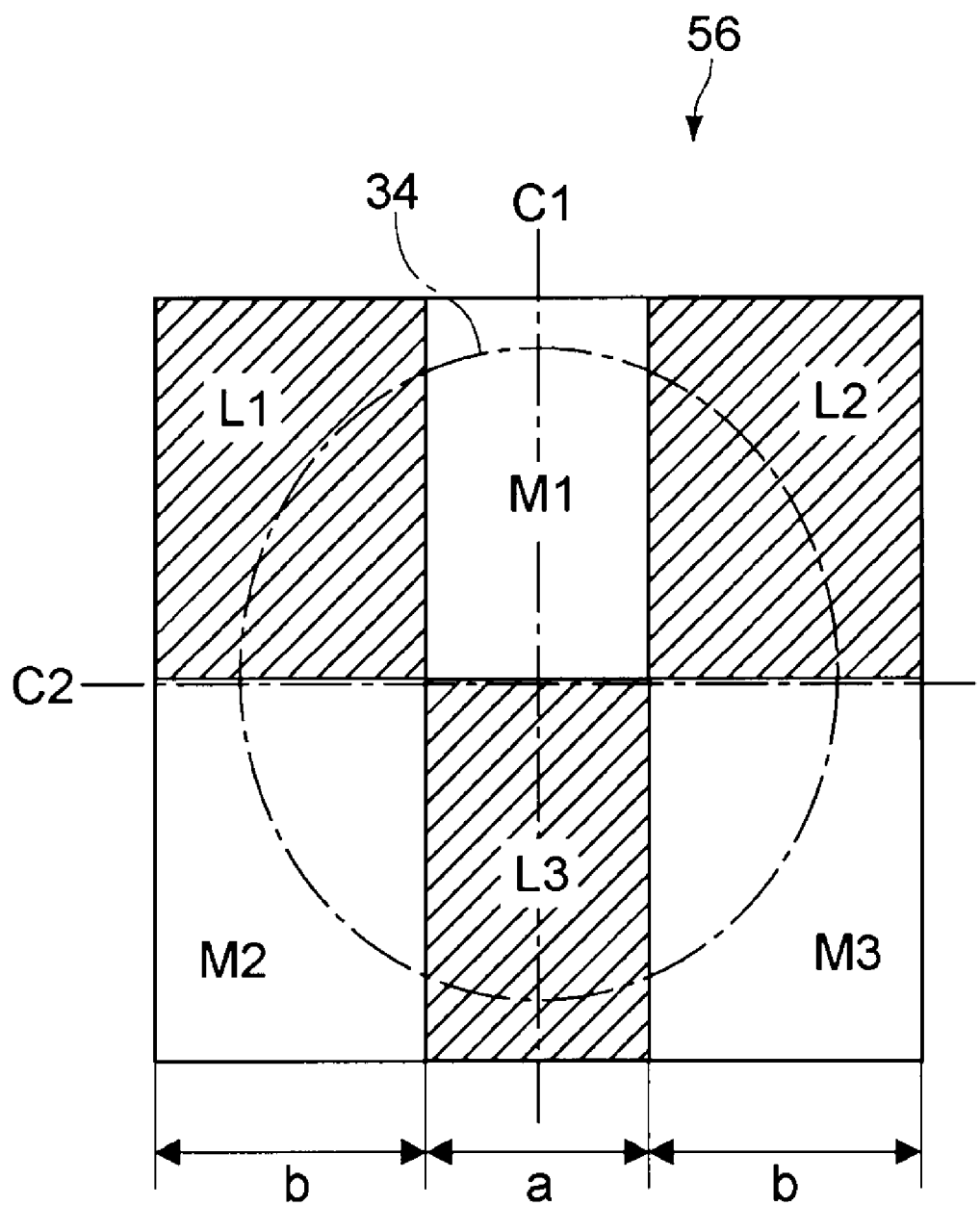
FIG. 11 is a front view showing a phase difference element having a region divided into six regions according to still another embodiment, viewed in the optical axis direction.

FIG. 11 is a front view showing a phase difference element according to still another embodiment, viewed in the optical axis direction.

This phase difference element 56 has regions L1 to L3 and regions M1 to M3, that is, a region divided into six regions. For example, the regions L1 to L3 are made of the same first material, and the regions M1 to M3 are made of the same second material different from the first material. Typically, as the material for the regions L1 to L3, the material for the region L shown in example 1 or 2 in FIG. 5 is used, and as the material for the regions M1 to M3, the material for the region M shown in example 1 or 2 in FIG. 5 is used. But the materials are not limited to these materials.

Incidentally, an antireflection film, a cover film, or the like may be formed on a front face and a rear face perpendicular to the optical axis direction of the phase difference element 56. A λ/4 plate or/and another polarized phase plate (not shown) may be included in the phase difference element 56. This antireflection film, λ/4 plate or another phase plate may be also provided in the above-mentioned phase difference element 26.

The widths of the regions L1 and M2 (or regions L2 and M3) are set to b, and the widths of the regions M1 and L3 are set to a (<b). The widths a and b are set to different values so that the setting of these widths, that is, areas (areas of respective regions L1, M1, and L2) cause the laser lights 34 to weaken each other efficiently in the regions L1, M1, and L2. The same goes for the regions M2, L3, and M3. Accordingly, these widths a and b can be changed appropriately depending on the material, the shape of the regions L1 to L3 and M1 to M3, or displacement of these regions.

The phase difference between the laser light 34 passing through the regions L1 to L3 and the laser light 34 passing through the regions M1 to M3 is substantially 180°, and these laser lights 34 substantially cancel each other out. However, the phase difference is not limited to 180°.

In the above-mentioned phase difference element 56, when viewed with a longitudinal central axis C1 (axis in the first direction within the plane perpendicular to the optical axis direction) as a symmetric axis, the laser lights 34 from the non-target layer passing through the regions L1, M1, and L2 weaken each other. Hereinafter, the laser light 34 from the non-target layer will be called stray light. Moreover, when viewed with the longitudinal central axis C1 as the symmetric axis, stray lights passing through the regions M2, L3, and M3 weaken each other.

Further, in this phase difference element 56, when viewed with a lateral central axis C2 (axis in the second direction perpendicular to the first direction) as the symmetric axis, stray lights passing through the regions L1 and M2 weaken each other, and stray lights passing through the regions M1 and L3 weaken each other. Furthermore, stray lights passing through the regions L2 and M3 weaken each other.

As just described, the phase difference element 56 can efficiently cancel the stray light since the interference portion of the stray light increases not only in the horizontal direction but also in the vertical direction.

As described above, the phase difference element 56 has a region divided into six regions, but the region may be divided into four, or eight or more even number. Alternatively, the phase difference element 56 may have a region divided into three, or five or more odd number. In the case where the region is divided into four, for example, in the phase difference element 56 in FIG. 11, both the regions M1 and L3 are eliminated.

The description is given above with the shape of the divided region as a rectangular shape as an example, but may be a polygonal shape with five or more angles and sides, and a region partially having a curve is also suitable.

Even when the phase difference element is placed between the PBS 23 and the PD 4, the phase difference element also has a region divided into three or more regions. For example, when the phase difference element has a region divided into six regions of regions L1 to L3 and regions M1 to M3, it is only necessary that a material having a first thickness be used for the regions L1 to L3, and a material having a second thickness different from the first thickness be used for the regions M1 to M3.

Figure 12:
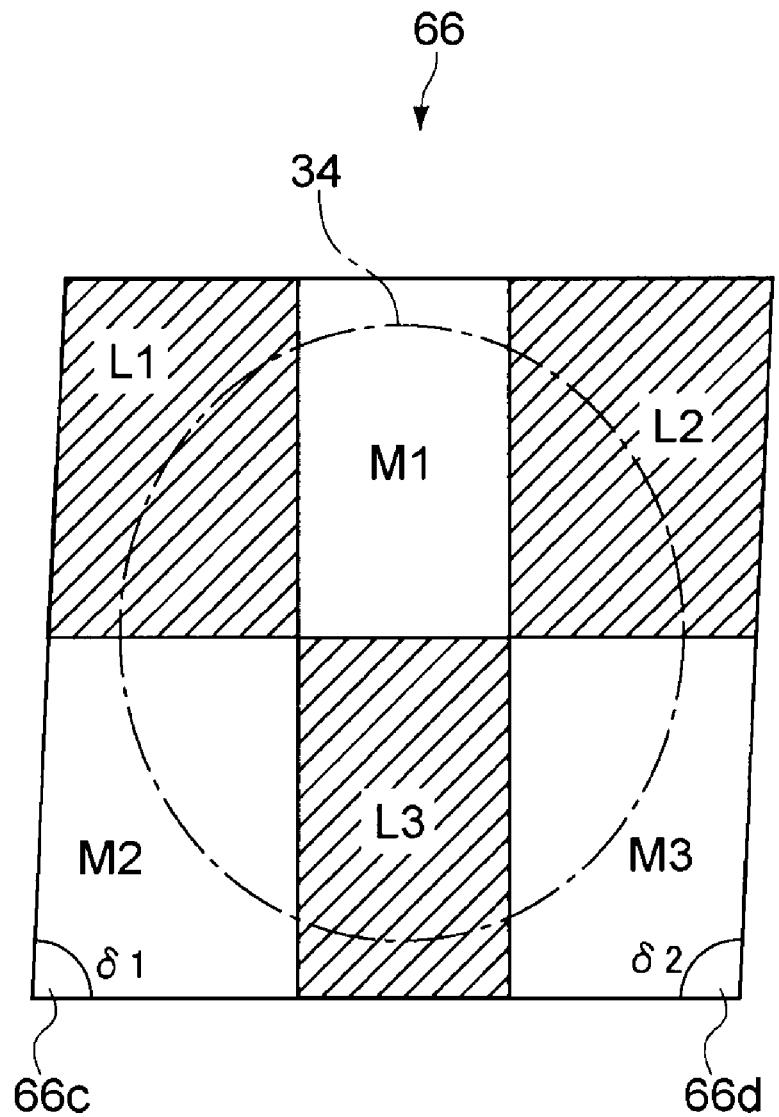
FIG. 12 is a front view showing another embodiment of the phase difference element shown in FIG. 11.

FIG. 12 is a front view showing another embodiment of the phase difference element shown in FIG. 11.

This phase difference element 66 differs from the phase difference element 56 shown in FIG. 11 in that the phase difference element 66 has corners formed at angles different from a right angle when viewed in the optical axis direction. For example, an angle δ1 of a corner 66*c* is 85±0.5°, and an angle δ2 of a corner 66*d* adjacent to the corner 66*c* is 95±0.5°. The angles δ1 and δ2 are not limited to these angles and can be changed appropriately.

The formation of these corners 66*c* and 66*d* enables a worker to easily distinguish between front and back sides with respect to the laser light of the phase difference element 66. In other words, the worker can distinguish between the front and back surfaces of the phase difference element 66 and build the phase difference element 66 into the optical system such that either surface thereof faces in a desired direction.

Alternatively, even when the corner 66*c* or 66*d* has a right angle (or does not have to have a right angle), a distinguishing mark to distinguish the front and back surfaces of the element may be provided in the phase difference element 66.

In FIG. 12, the phase difference element 66 having the region divided into six regions is used as an example. The corner of the phase difference element having the region divided into two regions shown in FIG. 4, or the region divided into three or four regions may have an angle which is not a right angle, and the distinguishing mark may be provided in such a phase difference element.

It is to be understood that the present invention is not intended to be limited to the above embodiment, and other various embodiments can be conceived.

The polarization-selective phase difference element may be placed on the optical path between the λ/4 plate 25 and the objective lens 3 or may be placed between the collimator lens 24 and the λ/4 plate 25. In this case, the directions of the circularly polarized light in the outward and return paths are different, and therefore a combination of materials for the regions L and M such that the circularly polarized light in the outward path is allowed to pass as it is and a predetermined phase difference is produced in the circularly polarized light in the return path is used. When the phase difference element is placed in the position mentioned above, the phase difference element may, of course, be a liquid crystal element.

In the above respective embodiments, the phase difference of the laser light produced by the phase difference element 26 or 46 is set to π[rad] . However, the phase difference may not necessarily be π, but needs to be set to a phase difference by which two laser lights which have passed through the regions L and M weaken each other.

Examples of the optical disk 2 include, in addition to the DVD, the CD, and the BD cited above, an HD (High-Definition)-DVD, a disk using near-field light, and so on.

What is claimed is:

1. An optical pickup apparatus for irradiating an optical recording medium having a plurality of recording layers on which a signal is recorded with laser light, comprising:
    a light source configured to emit the laser light;
    a light-concentrating element configured to concentrate the laser light emitted from the light source on the optical recording medium;
    a phase difference element having a region divided into at least two regions which the laser light reflected by the optical recording medium enters, and configured to produce a phase difference between first light and second light reflected by a non-target layer which is not a target of one of recording and reproduction of the signal out of the plurality of recording layers and enter the at least two regions, respectively, such that the first and the second light weaken each other; and
    a photodetector configured to receive the laser light emitted from the phase difference element.

2. The optical pickup apparatus as set forth in claim 1, further comprising:
    a dividing element configured to divide the laser light emitted from the light source into a main beam and a sub-beam to generate a tracking error signal,
    wherein the phase difference element produces the phase difference between the first and the second light of the main beam reflected by the non-target layer.

3. The optical pickup apparatus as set forth in claim 2, wherein the phase difference element produces the phase difference of π[rad] between the first light and the second light.

4. The optical pickup apparatus as set forth in claim 1, wherein the phase difference element is a polarization-selective element.

5. The optical pickup apparatus as set forth in claim 4, wherein the phase difference element is placed on an optical path between the polarization beam splitter and the photodetector.

6. The optical pickup apparatus as set forth in claim 5, wherein the phase difference element is a plate material configured such that the thickness thereof in an optical axis direction of the optical path differs between the at least two regions.

7. The optical pickup apparatus as set forth in claim 1, further comprising:
    a polarization beam splitter placed on an optical path of the laser light; and
    a λ/4 plate placed on the optical path between the polarization beam splitter and the light-concentrating element.

8. The optical pickup apparatus as set forth in claim 7, wherein the phase difference element is placed on the optical path between the polarization beam splitter and the λ/4 plate and produces the phase difference according to a state of linearly polarized light of the laser light.

9. The optical pickup apparatus as set forth in claim 8, wherein the phase difference element is an element having
    a first material including a first region out of the at least two regions, and
    a second material including a second region out of the at least two regions, the second material being different from the first material.

10. The optical pickup apparatus as set forth in claim 9, wherein the phase difference element is a polarization-selective element.

11. The optical pickup apparatus as set forth in claim 8, wherein the phase difference element is a liquid crystal element.

12. The optical pickup apparatus as set forth in claim 11, wherein the light source is capable of emitting a plurality of laser light beams having a plurality of wavelengths, respectively.

13. The optical pickup apparatus as set forth in claim 1, wherein the phase difference element has, as the region, a region divided into six regions constituted of a region divided into three regions in a first direction within a plane perpendicular to an optical axis direction of the laser light and a region divided into three regions in a second direction orthogonal to the first direction in the perpendicular plane.

14. An optical recording medium driving apparatus configured to drive an optical recording medium having a plurality of recording layers on which a signal is recorded, comprising:
    an optical pickup including
        a light source configured to emit laser light,
        a light-concentrating element configured to concentrate the laser light emitted from the light source on the optical recording medium,
        a phase difference element having a region divided into at least two regions which the laser light reflected by the optical recording medium enters, and configured to produce a phase difference between first light and second light reflected by a non-target layer which is not a target of one of recording and reproduction of the signal out of the plurality of recording layers and entering the at least two regions, respectively, such that the first and the second light weaken each other, and
        a photodetector receiving the laser light emitted from the phase difference element; and
    a recording/reproducing processor configured to perform at least one of recording of the signal on the optical recording medium and reproduction of the signal recorded on the optical recording medium by using the optical pickup.

15. A signal recording/reproducing method, comprising:
    emitting laser light;
    concentrating the emitted laser light on an optical recording medium having a plurality of recording layers on which a signal is recorded;
    producing, by causing the laser light reflected by a non-target layer which is not a target of one of recording and reproduction of the signal out of the plurality of recording layers to enter a region divided into at least two regions of a phase difference element, a phase difference between first light and second light which have entered the at least two regions, respectively, such that the first and the second light weaken each other;
    receiving the laser light emitted from the phase difference element; and
    performing at least one of recording of the signal on the optical recording medium and reproduction of the signal recorded on the optical recording medium on the basis of the received laser light.

* * * * *